(No Model.)

G. F. THOMPSON.
SPRING COUPLING FOR VEHICLES.

No. 300,660. Patented June 17, 1884.

Witnesses,
N. A. Clark
Jno. C. Schroeder

Inventor,
George F. Thompson
by Geo Walker.
Atty.

UNITED STATES PATENT OFFICE.

GEORGE F. THOMPSON, OF OSHKOSH, WISCONSIN, ASSIGNOR TO HIMSELF AND ANDREW WILSON, OF SAME PLACE.

SPRING-COUPLING FOR VEHICLES.

SPECIFICATION forming part of Letters Patent No. 300,660, dated June 17, 1884.

Application filed February 15, 1884. (No model.)

*To all whom it may concern:*

Be it known that I, GEORGE F. THOMPSON, of Oshkosh, in the county of Winnebago and State of Wisconsin, have invented a new and useful Device for Coupling Side Springs to Vehicle-Bodies; and I do hereby declare that the following is a full, clear, and exact description of the same, reference being had to the accompanying drawings, and to the letters of reference marked thereon.

The invention involved in the present application has exclusive reference to that class of vehicles known as "combination-wagons," or those having platform-springs in the rear and an elliptic spring in front; and the invention consists in the construction and arrangement of a device for loosely coupling the side springs of the rear set to the body of the vehicle, whereby said body is permitted at all times to maintain its true horizontal position, and the side springs are allowed to lengthen, to thereby prevent the wagon-body from inclining or sagging when the load is imposed on either side of the longitudinal center thereof.

The invention further consists in the combination, with such coupling device, of the ordinary step, all as more fully hereinafter described, and pointed out in the claim.

For the better understanding of my invention, and to enable those skilled in its relative art to know how to construct and apply the same, frequent reference will be made to the accompanying drawings, in which—

Figure 1:
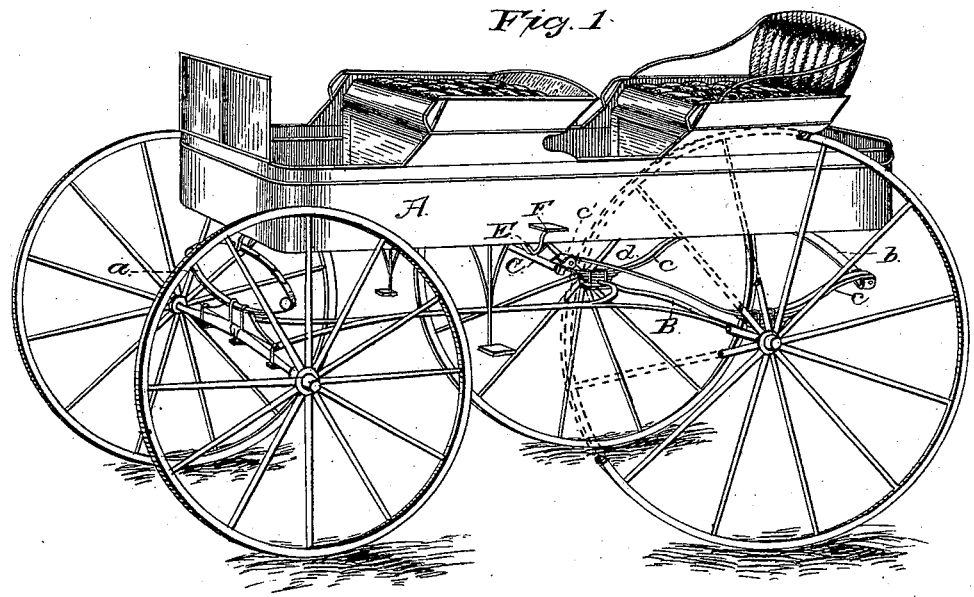
Figure 2:
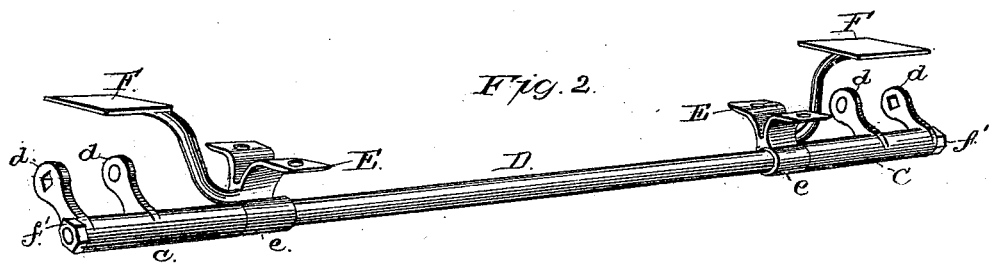
Figure 3:

Figure 1 represents a view in perspective of a wagon and its side springs coupled to the body in accordance with my invention; Fig. 2, a view in detail of the coupling device complete, and Fig. 3 a similar view of one end of the rod connecting the two inner ends of the side springs.

A represents the body of the vehicle, mounted at its front end upon an elliptic spring, *a*, and at its rear end upon a semi-elliptic spring, *b*. This last-named spring supports at its outer ends the rear ends of the two side springs, *c c*, which are secured to the rear axle, B. Each of said springs *c c* is provided at its under or forward end with an eye or socket, *c'*, which by means of an ordinary bolt is coupled between the two ears *d d* of a sleeve or collar, C, encircling each end of a rod, D, outside of a bracket, E, which supports said rod. The said rod D, which is of cylindrical form, passes transversely beneath the wagon-body, and is supported, as above referred to, by brackets E E, rigidly secured to the under side of the body. These brackets are each cast or forged with an ordinary step, F, and a cylindrical socket, *e*, which loosely encircles the rod D at the point shown.

In order that the sleeves or collars *c c* may turn concurrently with rod D, and thereby permit the side springs to accede to any pressure, the said rod is accordingly made square upon its outer ends, and each sleeve or collar is correspondingly shaped to fit the same. By means of a screw-threaded shank, *f*, cast or forged upon each end of the rod D, and a nut, *f'*, the collars or sleeves *c c* are prevented from sliding from the rod.

From the foregoing description it will be apparent that when any weight is imposed on one side of the wagon-body, the rod D will turn and thereby cause an equal depression upon the opposite side, and thus under all circumstances the wagon-body maintains a true horizontal position, with a decreased strain upon the side springs.

It will further be apparent that this device possesses advantages over others of a similar nature, in that it economizes in the number of elements employed and in the manufacture of the same; and as each element is cast independent of the other, few joints exist, and the durability of the parts is increased, with a corresponding decrease in the wear of the same.

It will be obvious that the connection between the side springs and the sleeves or collars could be effected by links cast with the latter, and that, instead of loosely journaling the rod D in the brackets E E and rigidly journaling it in the sleeves or collars C C, it could be journaled vice versa with the same result.

I am acquainted with the invention described and claimed in patent to Shaver, August 22, 1881, No. 246,225, and lay no claim to the construction and arrangement thereof; but

What I claim as new, and desire to secure by Letters Patent, is—

The combination of a transverse rod for connecting the ends and equalizing the action of the side springs of a vehicle, and a pair of brackets secured to the body and each cast with a step and with a socket for supporting said rod, substantially as described and shown.

In testimony whereof I affix my signature in presence of two witnesses.

GEORGE F. THOMPSON.

Witnesses:
H. L. LAWSON,
DAVID LAWSON.